US010385681B2

(12) United States Patent
Chemali et al.

(10) Patent No.: US 10,385,681 B2
(45) Date of Patent: Aug. 20, 2019

(54) CROSS-COUPLING BASED FLUID FRONT MONITORING (71) Applicant: HALLIBURTON ENERGY SERVICES, INC., Houston, TX (US)

(72) Inventors: Roland E. Chemali, Humble, TX (US); Dagang Wu, Katy, TX (US); Burkay Donderici, Houston, TX (US); Michael S. Bittar, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 15/035,389

(22) PCT Filed: Nov. 21, 2013

(86) PCT No.: PCT/US2013/071207
§ 371 (c)(1),
(2) Date: May 9, 2016

(87) PCT Pub. No.: WO2015/076806
PCT Pub. Date: May 28, 2015

(65) Prior Publication Data
US 2016/0290124 A1 Oct. 6, 2016

(51) Int. Cl.
E21B 47/10 (2012.01)
E21B 43/16 (2006.01)
(Continued)

(52) U.S. Cl.
CPC .......... E21B 47/102 (2013.01); E21B 43/164 (2013.01); E21B 43/20 (2013.01);
(Continued)

(58) Field of Classification Search
CPC .... E21B 17/003; E21B 17/028; E21B 43/164; E21B 43/20; E21B 43/2406;
(Continued)

(56) References Cited

U.S. PATENT DOCUMENTS 4,670,717 A 6/1987 Sender
5,662,165 A 9/1997 Tubel et al.
(Continued)

FOREIGN PATENT DOCUMENTS

WO 2006/005555 1/2006
WO 2011/115646 9/2011
(Continued)

OTHER PUBLICATIONS

"CA Office Action", dated Feb. 27, 2017, Appl No. 2,927,691, "Cross-Coupling Based Fluid Front Monitoring," Filed Nov. 21, 2013, 6 pgs.
(Continued)

Primary Examiner — Jeff W Natalini
Assistant Examiner — Steven L Yeninas
(74) Attorney, Agent, or Firm — Jason Sedano; C. Tumey Law Group PLLC (57) ABSTRACT Device, system, and method embodiments provide fluid front monitoring via permanent, casing-mounted electromagnetic (EM) transducers. One or more casing strings have one or more transmit antennas that each encircle a casing string and one or more receive antennas that similarly encircle the casing string, with at least one receive antenna oriented differently from at least one transmit antenna to provide sensitivity to at least one cross-component signal. A processor unit derives an estimated distance to a fluid front, and may further determine a direction and orientation of the fluid front for display to a user. Signals from an array of transmit and receive antennas may be combined, optionally (Continued)

with signals from other boreholes, to locate and track multiple points on the fluid front. In response to the determined location and progress of the front, the processor unit may further provide control settings to adjust injection and/or production rates.

22 Claims, 5 Drawing Sheets

(51) Int. Cl.
*E21B 43/20* (2006.01)
*E21B 43/24* (2006.01)
*E21B 47/12* (2012.01)
*G01V 3/10* (2006.01)

(52) U.S. Cl.
CPC .......... *E21B 43/2406* (2013.01); *E21B 47/10* (2013.01); *E21B 47/122* (2013.01); *G01V 3/10* (2013.01)

(58) Field of Classification Search
CPC .... E21B 47/0905; E21B 47/10; E21B 47/101; E21B 47/102; E21B 47/12; E21B 47/121; E21B 47/122; E21B 47/123; E21B 47/124; E21B 47/114; E21B 47/16; E21B 47/18; E21B 47/182; E21B 47/185; E21B 47/187; G01V 3/02; G01V 3/04; G01V 3/06; G01V 3/08; G01V 3/081; G01V 3/082; G01V 3/083; G01V 3/084; G01V 3/085; G01V 3/086; G01V 3/087; G01V 3/088; G01V 3/10; G01V 3/101; G01V 3/102; G01V 3/104; G01V 3/105; G01V 3/107; G01V 3/108; G01V 3/12; G01V 3/18; G01V 3/20; G01V 3/22; G01V 3/24; G01V 3/26; G01V 3/28; G01V 3/30; G01V 3/32; G01V 3/34; G01V 3/36; G01V 3/40
USPC ........... 175/50, 48; 324/323–375; 73/152.18, 73/152.21, 152.29; 166/250.03, 250.1, 166/252.1, 252.4, 254.1
See application file for complete search history.

(56) References Cited

U.S. PATENT DOCUMENTS

| 6,152,226 | A * | 11/2000 | Talwani ................ E21B 43/16 166/245 |
|---|---|---|---|
| 6,181,138 | B1 | 1/2001 | Hagiwara et al. |
| 6,525,540 | B1 * | 2/2003 | Kong ........................ G01S 7/03 166/250.01 |
| 6,615,917 | B2 | 9/2003 | Bussear et al. |
| 6,691,779 | B1 | 2/2004 | Sezginer et al. |
| 7,040,390 | B2 | 5/2006 | Tubel et al. |
| 7,140,434 | B2 | 11/2006 | Chouzenoux et al. |
| 7,463,035 | B2 * | 12/2008 | Merchant .............. E21B 47/022 324/339 |
| 7,659,722 | B2 | 2/2010 | Bittar |
| 2004/0060708 | A1 | 4/2004 | Clark et al. |
| 2006/0119363 | A1 * | 6/2006 | Ligneul ................. E21B 47/042 324/337 |
| 2007/0040557 | A1 * | 2/2007 | Johnstad ............... E21B 47/042 324/324 |
| 2007/0235225 | A1 | 10/2007 | Bittar |
| 2010/0176812 | A1 * | 7/2010 | Bittar ....................... G01V 3/24 324/339 |
| 2010/0262370 | A1 * | 10/2010 | Bittar ................... G01V 11/002 702/6 |
| 2011/0308794 | A1 | 12/2011 | Bittar et al. |
| 2012/0193092 | A1 | 8/2012 | Qu et al. |

FOREIGN PATENT DOCUMENTS

| WO | 2012/144977 | 10/2012 |
|---|---|---|
| WO | 2012144977 | 10/2012 |
| WO | 2015/076806 | 5/2015 |

OTHER PUBLICATIONS

"CN Office Action", dated Jun. 2, 2017, Appl. No. 2013800803390, "Cross-Coupling Based Fluid Front Monitoring", filed Nov. 21, 2013, 6 pgs.

GB Examination Report, dated Jan. 6, 2017, Appl No. 1606956.9, "Cross-Coupling Based Fluid Front Monitoring," Filed Nov. 21, 2013, 3 pgs.

AU Examination Report, dated Jul. 15, 2016, Appl No. 2013405929, "Cross-Coupling Based Fluid Front Monitoring," Filed Nov. 21, 2013, 3 pgs.

Van Dam, Remke L., "Landform Characterization Using Geophysics-Recent Advances, Applications, and Emerging Tools," Geomorphology, vol. 137, Issue 1, Jan. 15, 2012, pp. 57-73, Geospatial Technologies and Geomorphological Mapping Proceedings of the 41st Annual Binghamton Geomorphology Symposium.

PCT International Search Report and Written Opinion, dated Aug. 19, 2014, Appl No. PCT/US2013/071207, "Cross-Coupling Based Fluid Front Monitoring," Filed Nov. 21, 2013, 15 pgs.

PCT International Preliminary Report on Patentability, dated Dec. 7, 2015, Appl No. PCT/US2013/071207, "Cross-Coupling Based Fluid Front Monitoring," Filed Nov. 21, 2013, 8 pgs.

Miorali, Mattia et al., "A Modeling Study of a Borehole Radar System as a Permanent Down-Hole Sensor", Delft University of Technology and Rob Arts, Proceedings of SEG Annual Meeting, 2009, p. 1-5, Delft University of Technology and TNO, The Netherlands.

US EPA, "Ground-Penetrating Radar", Environmental Geophysics, 10 pgs., Retrieved from the Internet on Jun. 4, 2013, website http://www.epa.gov.

Chinese Office Action for Application No. 2013800803390 dated Feb. 23, 2018.

* cited by examiner

CROSS-COUPLING BASED FLUID FRONT MONITORING

BACKGROUND

Oilfield operating companies seek to maximize the profitability of their reservoirs. Typically, this goal can be stated in terms of maximizing the percentage of extracted hydrocarbons subject to certain cost constraints. A number of recovery techniques have been developed for improving hydrocarbon extraction. For example, many companies employ flooding techniques, injecting a gas or a fluid into a reservoir to displace the hydrocarbons and sweep them to a producing well. As another example, some heavy hydrocarbons are most effectively produced using a steam-assisted gravity drainage technique, where steam is employed to reduce the hydrocarbons' viscosity.

Such recovery techniques create a fluid front between the injected fluid and the fluid being displaced. The position of the fluid front is a key parameter for the control and optimization of these recovery techniques, yet it is usually difficult to track due to the absence of suitably feasible and effective monitoring systems and methods. Where the use of seismic surveys, monitoring wells and/or wireline logging tools is infeasible, operators may be forced to rely on computer simulations to estimate the position of the fluid front, with commensurately large uncertainties. Yet suboptimal operations may cause premature breakthrough where one part of the fluid front reaches the producing well before the rest of the front has properly swept the reservoir volume. Such premature breakthrough creates a low-resistance path for the injected fluid to follow and deprives the rest of the system of the power it needs to function. Prevention of premature breakthrough is generally considered preventable with adequate forewarning of a fluid front's approach to the producing well(s).

DESCRIPTION OF THE DRAWINGS

Accordingly, there are disclosed in the drawings and the following description various cross-coupling compensation methods and systems employing cross-coupling based fluid front monitoring via non-parallel antennas around a permanently-installed casing string. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain disclosed device, system, and method embodiments provide fluid front monitoring via permanent, casing-mounted electromagnetic (EM) transducers. One or more boreholes is provided with a casing string having one or more transmit antennas that encircle the casing string and one or more receive antennas that encircle the casing string, with at least one receive antenna oriented differently from at least one transmit antenna to provide sensitivity to at least one cross-component signal. Based at least in part on the cross-component signal, a processor unit derives an estimated distance to a fluid front, and may further determine a direction and orientation of the fluid front for display to a user. Signals from an array of transmit and receive antennas may be combined, optionally with signals from other boreholes, to locate and track multiple points on the fluid front. In response to the determined location and progress of the front, the processor unit may further provide control settings to adjust injection and/or production rates.

Figure 1:
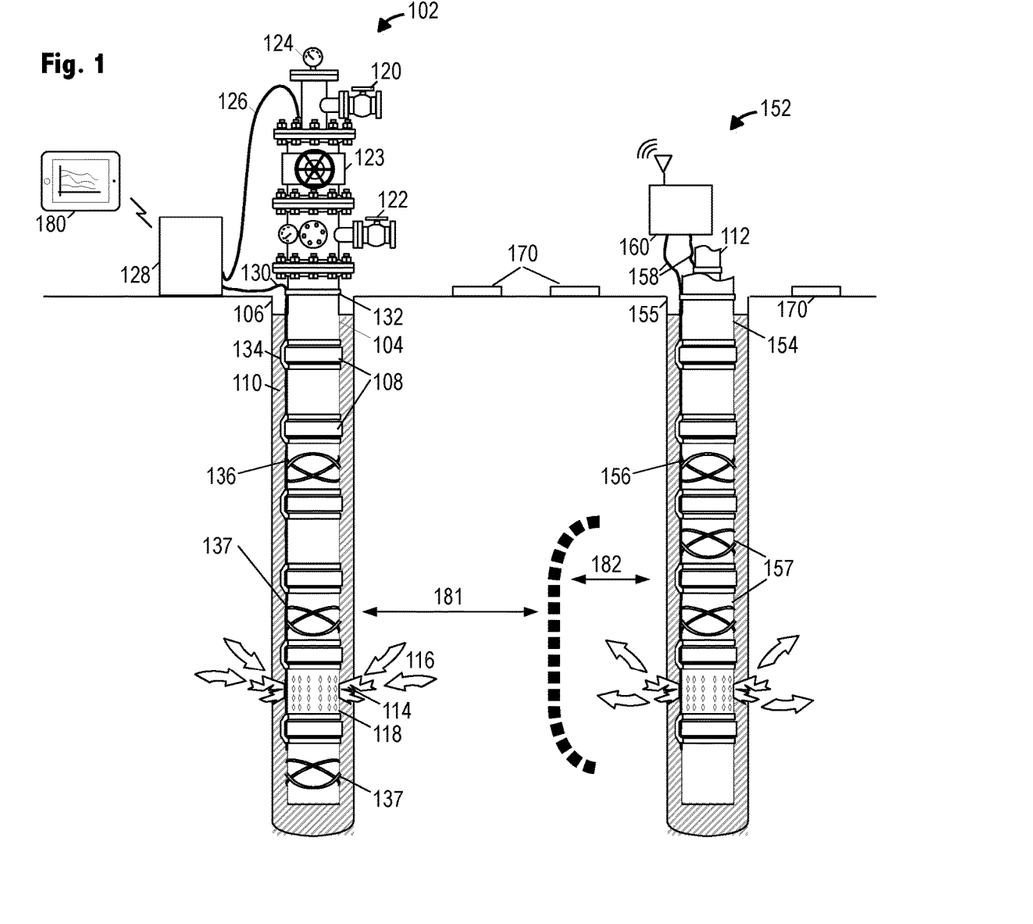
FIG. 1 is a schematic depiction of an illustrative permanent electromagnetic (EM) fluid front monitoring system.

FIG. 1 shows a well 102 equipped with an illustrative embodiment of a permanent electromagnetic (EM) fluid front monitoring system. The illustrated well 102 has been constructed and completed in a typical manner, and it includes a casing string 104 positioned in a borehole 106 that has been formed in the earth by a drill bit. The casing string 104 includes multiple casing tubulars (usually 30 foot long steel tubulars) connected end-to-end by couplings 108. Alternative casing types include continuous tubing and, in some rare cases, composite (e.g., fiberglass) tubing. Cement 110 has been injected between an outer surface of the casing string 104 and an inner surface of the borehole 106 and allowed to set. The cement enhances the structural integrity of the well and seals the annulus around the casing against undesired fluid flows. Though well 102 is shown as entirely cemented, in practice certain intervals may be left without cement, e.g., in horizontal runs of the borehole where it may be desired to facilitate fluid flows.

Perforations 114 have been formed at one or more positions along 106 to facilitate the flow of a fluid 116 from a surrounding formation into the borehole and thence to the surface. The casing string may include pre-formed openings 118 in the vicinity of the perforations 114, or it may be perforated at the same time as the formation. Typically the well 102 is equipped with a production tubing string positioned in an inner bore of the casing string 104. (A counterpart production tubing string 112 is visible in the cutaway view of well 152.) One or more openings in the production tubing string accept the borehole fluids and convey them to the earth's surface and onward to storage and/or processing facilities via production outlet 120. The wellhead may include other ports such as port 122 for accessing the annular space(s) and a blowout preventer 123 for blocking flows under emergency conditions. Various other ports and feed-throughs are generally included to enable the use of external sensors 124 and internal sensors. Illustrative cable 126 couples such sensors to a well interface system 128. Note that this well configuration is merely for illustrative purposes, is not to scale, and is not limiting on the scope of the disclosure.

The interface system 128 typically supplies power to the transducers and provides data acquisition and storage, possibly with some amount of data processing. The permanent EM monitoring system is coupled to the interface system 128 via an armored cable 130, which is attached to the exterior of casing string 104 by straps 132 and protectors 134. (Protectors 134 guide the cable 130 over the couplings 108 and shield the cable from being pinched between the coupling and the borehole wall.) The cable 130 connects to one or more electromagnetic transducer modules 136, 137 attached to the casing string 104. Each of the transducer modules 136, 137 may include a layer of nonconductive material having a high permeability to reduce interference from casing effects.

FIG. 1 further shows a second well, injection well 152, having a second casing string 154 in a borehole 155, with one or more EM transducer modules 156, 157 attached to the casing string and communicating via one or more cables 158 to a second well interface system 160. The second well interface system may be connected in a wired or wireless fashion to the first well interface system or to a central data processing system that coordinates the operation of the wells. As the injection well drives a fluid such as water, $CO_2$, or natural gas, into the formation, the injected fluid displaces the desired hydrocarbons and sweeps them outward from the injection well. The presence of any producing wells in the vicinity reduces the formation pressure, causing the displaced fluid (and the injected fluid) to preferentially migrate toward the producing wells. The interface between the displaced fluid and the injected fluid is called the "front". Oil companies are interested in monitoring the movement of the front and to know in advance when it is about to reach the production well.

Figure 2:
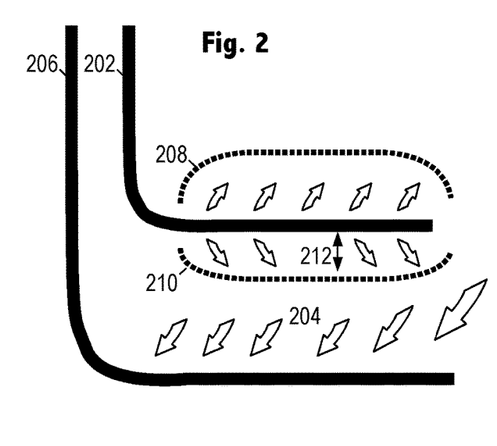
FIG. 2 is a schematic depiction of a steam-assisted gravity drainage operation.

Though FIG. 1 shows vertical wells, these principles also apply to horizontal and deviated wells. They may also apply where the injected fluid does not act as a drive fluid. For example, FIG. 2 shows a steam-assisted gravity drainage (SAGD) operation, in which an injection well 202 circulates and injects steam into a surrounding formation. As the thermal energy from the steam reduces the viscosity of the heavy oil in the formation, the heavy oil (and steam condensate) 204 is drawn downward by gravity to a producing well 206 drilled parallel and from about 5-20 ft lower. In this manner, the steam forms an expanding "steam chamber" 208 that delivers thermal energy to more and more heavy oil. The chamber primarily grows in an upward direction, but there is a front 210 that gradually moves downward towards the producing well 206. Excessive injection rates will drive the front 210 prematurely to the producing well, creating an unwanted flow path that severely reduces the operation's efficiency. Either or both of the wells 202, 206, may be equipped with EM transducer modules to track the distance 212 of front 210. (The front is detectable because injected steam has different resistive and dielectric properties than the formation and the heavy oil.)

Often companies will drill additional wells in the field for the sole purpose of monitoring the front and predicting its arrival at the producing wells. In the systems of FIGS. 1 and 2, additional wells and well interfaces may be included in the coordinated operation of the field and the permanent EM monitoring system. (Some system embodiments employ EM transducer modules in only one well, but it is generally preferred to provide additional EM transducer modules on the surface and/or in other nearby wells.) The additional wells may be single-purpose wells (i.e., only for injection, production, or monitoring), or they may serve multiple purposes, some of which may change over time (e.g., changing from a producing well to an injection well).

Returning to FIG. 1, the illustrated system further includes surface transducer modules 170. The surface transducer modules 170 may employ spaced-apart electrodes that create or detect EM signals, wire coils that create or detect EM signals, or magnetometers or other EM sensors to detect EM signals. At least one of the transducer modules 136, 156, 170 transmits EM signals while the receiver modules 137, 157 obtain responsive measurements. In some implementations, each of the transducer modules is a single-purpose module, i.e., suitable only for transmitting (136, 156) or receiving (137, 157), but it is contemplated that in at least some implementations, the system includes one or more transducer modules that can perform both transmitting and receiving.

The EM transducer modules 136, 156 can transmit or receive arbitrary waveforms, including transient (e.g., pulse) waveforms, periodic waveforms, and harmonic waveforms. The transducer modules 137, 157 can further measure natural EM fields including magnetotelluric and spontaneous potential fields. Without limitation, suitable EM signal frequencies for reservoir monitoring include the range from 1 Hz to 10 kHz. In this frequency range, the modules may be expected to detect signals at transducer spacings of up to about 200 feet, though of course this varies with transmitted signal strength and formation conductivity. Lower (below 1 Hz) signal frequencies may be suitable where magnetotelluric or spontaneous potential field monitoring is employed. Higher signal frequencies may also be suitable for some applications, including frequencies as high as 500 kHz, 2 MHz, or more.

FIG. 1 further shows a processor unit 180 that communicates wirelessly with the well interface system 128 to obtain and process EM measurement data and to provide a representative display of the information to a user. The processor unit 180 can take different forms including a tablet computer, laptop computer, desktop computer, and virtual cloud computer. Whichever processor unit embodiment is employed includes software that configures the unit's processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the transducer modules and inverts the measurements to obtain one or more parameters such as fluid front distance 181 (or 182), direction, and orientation. Additional parameters may include a resistivity distribution and an estimated water saturation.

The processor unit 180 may further enable the user to adjust the configuration of the transducers, varying such parameters as firing rate of the transmitters, firing sequence of the transmitters, transmit amplitudes, transmit waveforms, transmit frequencies, receive filters, and demodulation techniques. In some contemplated system embodiments, the processor unit further enables the user to adjust injection and/or production rates to optimize production from the reservoir.

Figure 3:
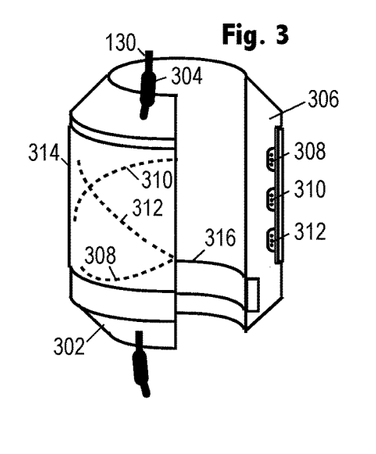
FIG. 3 shows an illustrative multicomponent EM transducer module.

FIG. 3 is a partial cross-section of an illustrative EM transducer module 302 coupled to armored cable 130 by couplers 304. The module body 306 is designed to fit over a casing tubular as the casing tubular is being used to extend the casing string. Alternatively, special casing tubulars may be manufactured with the EM transducer module formed in place on the exterior of the casing or, in some embodiments, partially embedded in the wall of the casing tubular. Module body 306 may be fixed in place with, e.g., clamps or adhesive. The illustrated module 302 includes three tilted antennas 308, 310, 312, each tilted by the same amount, but skewed in different azimuthal directions. The azimuthal directions are preferably spaced 120° apart. The amount of tilt can vary, so long as the angle between the antenna axis and the tool axis is greater than zero. Contemplated tilts include 30°, 45° and 54.7°. (The latter tilt makes the three antennas orthogonal to each other.) Some alternative module embodiments employ one untilted (i.e., coaxial) antenna. Many variations are possible, though it is contemplated that at least one receive antenna will be responsive to at least one transmit antenna with a different (i.e., non-parallel) orientation. In the embodiments of FIG. 1, triaxial receive antennas 137, 157, respond to triaxial transmit antennas 136, 156.

A protective shell 314 covers the antennas, which may be seated in grooves for even greater protection. Some contemplated embodiments include fins or centralizer ribs to further protect the module. The body of module 306 preferably includes at least a layer of a nonconductive material having a high magnetic permeability, and in some embodiments, the entire body of the module comprises such a material. With such a layer between the antennas and the casing, the dissipative effects of the casing can be reduced. The shell and any fins or ribs are preferably made with a material having a low magnetic permeability.

An embedded electronics module 316 may coordinate the operation of the antennas and provide communication with the well interface 128. In at least some embodiments, the modules are coordinated to operate in a fashion similar to Halliburton's Azimuthal Deep Resistivity tool, with one or more coaxial transmit antennas and one or more tilted receive antennas. Though the ADR tool employs spaced-apart transmit and receive antennas, some contemplated embodiments of the fluid front monitoring system employ co-located transmit and receive antennas. With multi-axial transmit and/or receive antennas, it is possible to resolve the ZZ coupling from the ZX and ZY couplings and to "scan" in multiple azimuthal directions from the casing string. With a sinusoidal signal frequency of 20 kHz and a transmit-to-receiver spacing of 560 inches, the system may be expected to detect an approaching front from nearly 100 ft away. Multiple receivers for phase difference and/or amplitude ratio measurements will enable rejection of unwanted effects such as calibration errors and drifts in the electrical circuitry.

Where a multi-axial receiver is not feasible, the contemplated embodiments have the receive antenna tilted "toward" the transmitter and the expected arrival direction of the front. In other words, the axis of the tilted antenna is in a plane that includes a vector from the receive antenna to the transmit antenna and a vector from the receive antenna to the nearest point on the arriving front, with one side of the axis positioned between the vectors so as to form an acute angle with each vector. The receive signal will be a blend of ZZ and ZX couplings.

Figure 4A:
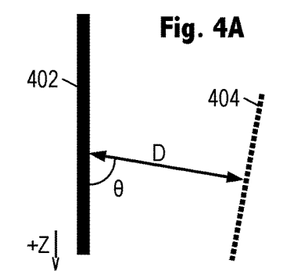
FIGS. 4A-4B show geometrical inversion parameters for an illustrative fluid front inversion.
Figure 4B:
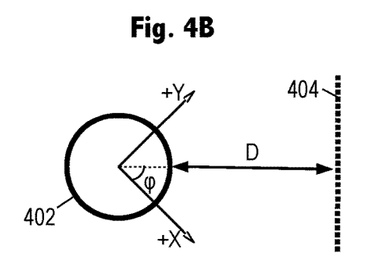

FIGS. 4A-4B define certain geometrical parameters that are useful for the ensuing discussion. FIG. 4A shows a side view of casing 402 extending along a downwardly-directed casing axis (the Z-axis). A front 404 is shown at a distance D from the receiver location. The front 404 need not be parallel to the casing axis, and in fact FIG. 4A shows the front at a relative dip angle $\theta$ (measured from the positive Z axis). FIG. 4B shows an end view of the casing 402, with an X-axis defining a zero-azimuth, which may be the high-side of the borehole or, for a vertical well, may be North. The azimuth angle $\varphi$, or "strike", of the front 404 is measured counterclockwise from the X-axis. Similarly, the tilt of the antennas can also be specified in terms a tilt angle (relative dip) $\theta$ and azimuth $\varphi$ of the antenna axis.

Figure 5A:
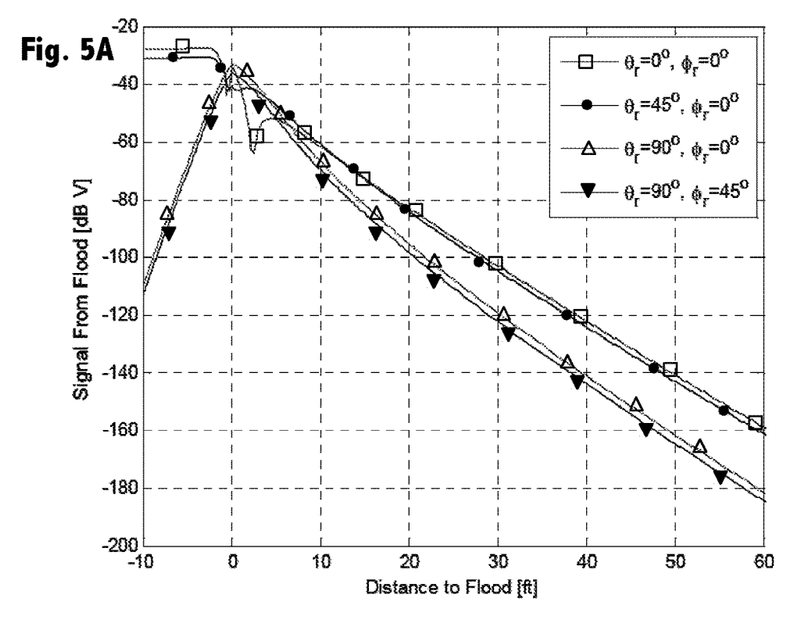
FIGS. 5A-5B plot a fluid front signal response as a function of different parameters.
Figure 5B:
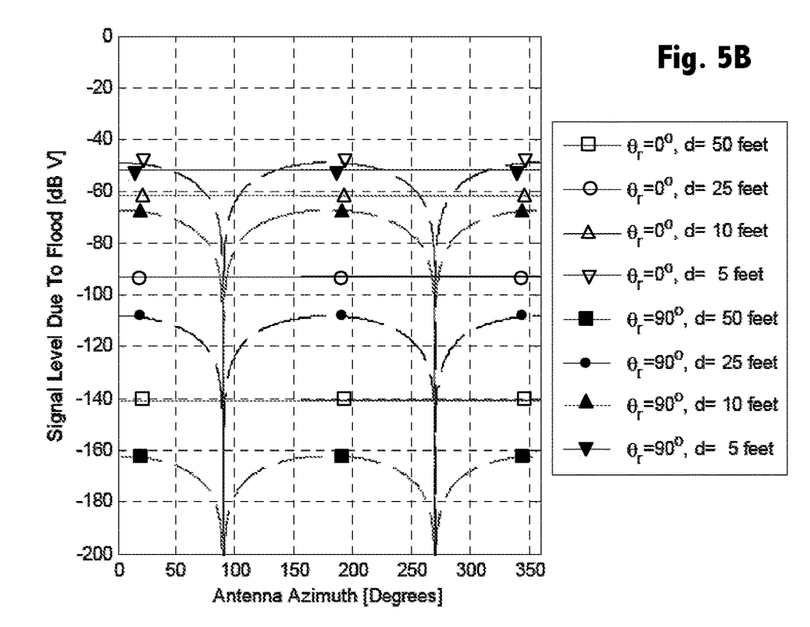

With these parameters in mind, FIGS. 5A-5B show synthetic data for a fluid front monitoring system. The synthetic model assumes a fluid front parallel to the casing axis (i.e., relative dip 90°) at an azimuth of zero. Resistivity of the formation with the undisplaced fluid is taken as 20 ohm-m, and the resistivity of the formation with the injected fluid is taken as 1 ohm-m. A coaxial transmit antenna is separated from the receive antenna by 100 inches. FIG. 5A shows the resulting signal strength as a function of fluid front distance for different receive antenna orientations. (Negative distance means the fluid front has passed the casing.) With a coaxial receive antenna that measures the ZZ coupling component, the signal strength from the approaching fluid front increases until the front approaches within about 100 inches of the casing, drops until the front comes within about 25 inches, rises until the front reaches the casing, but then drops again as the front passes the casing before finally increasing to a steady maximum value. The distance dependence of this signal is undesirably complex, though at distances beyond 100 inches it is monotonic and the strongest of the signals shown here.

With a receive antenna tilted at 90° in the direction of the approaching front to measure the ZX coupling component, the signal strength dependence is much simpler, with a peak where the front reaches the casing and a steady fall-off thereafter. Similar performance is observed for a 90° tilted antenna oriented at 45° to the approaching front. FIG. 5A also shows a curve for an antenna tilted at 45° in the direction of the approaching front. This curve is a blend of the ZZ and ZX responses, having a comparable signal strength at large distances and a nearly-monotonic distance dependence at short distances.

FIG. 5B shows signal strength as a function of antenna azimuth for untilted (ZZ coupling) and 90° tilted receive antennas (cross-coupling) at four different distances from the front: 5, 10, 25, and 50 ft. The untilted antennas, of course, show no azimuthal dependence, while the tilted antennas show nulls at 90° and 270° of azimuth. At short distances, the cross-coupling signals are comparable and in some orientations, stronger than the direct coupling signals. When the monotonic distance dependence is taken into account, the cross-coupling signals become very desirable for tracking an approaching front. Moreover, the cross-coupling signals enable tracking of the front even after it has passed the casing, making it possible to track the fluid front even from behind. It can also be seen that for a fluid front that is close to the sensor, the percentage of the XZ signal relative to the ZZ signal is much higher than the cases where the fluid front is farther out. However, even in the case of a fluid front at 50 feet, XZ constitutes about 1% of the ZZ signal, which should be sufficient to enable azimuthal interpretation.

Thus, by using electromagnetic tilted receive antennas, a large lateral sensitivity is achieved. Modeling and experience have shown that the use of a ZX antenna configuration along with geosignal processing (i.e., normalizing the receive signal with an azimuthally-averaged signal) conveys much higher sensitivity to events approaching the tubular, than a ZZ configuration. The latter, in turn, is known to be even more sensitive than an electrode galvanic type device.

The inductive system described above is not only sensitive to approaching fluid fronts, but also other static inhomogeneous formation features. That is, the receive signals will have a contribution from the background and a contribution from the fluid front. A calibration operation can be applied to remove the background contribution and enable subsequent processing to focus on the fluid front contribution. In at least some embodiments, this operation consists of making a background measurement when the fluid front is far away and subtracting it from any subsequent measurement. This subtraction ensures that only changes due to fluid front are measured. It also ensures that fluid front can be detected as far away as possible.

When measurements by multiple subarrays are combined, a more complete view of the approaching front can be obtained. Time-domain and/or frequency domain electromagnetic signals can be employed to perform accurate real-time inversion, or with sufficient data from multiple transducers and arrays, to perform accurate imaging and tomography of the steam injection region. The measurements can be repeated to obtain time-lapse monitoring of the injection process. In addition, the conductive casing used for nearby wells will make those wells detectable via the electromagnetic signals.

Figure 6:
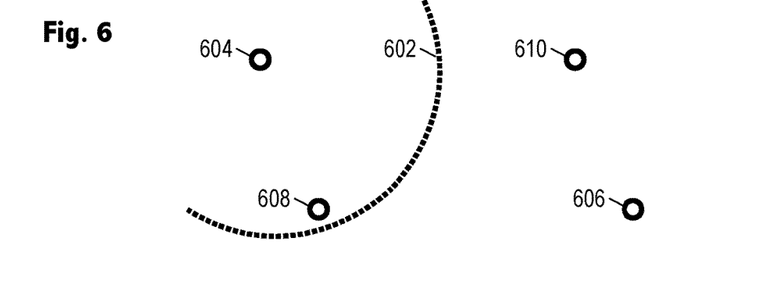
FIG. 6 is a schematic depiction of a fluid front propagating from an injector well.

FIG. 6 shows an overhead perspective of a field having an injection fluid front 602 propagating outwards from an injection well 604 towards a producing well 606. Monitoring wells 608, 610, may be provided to enable better monitoring of the front in the region intermediate the injection and producing wells. The positions of the wells and the EM transducers, together with the operating parameters such as transmit signal frequencies, can be chosen using optimization via numerical simulations and/or measurements from LWD and wireline tools during the drilling process. The design parameters are chosen to obtain adequate range and resolution with a minimum cost.

Figure 7A:
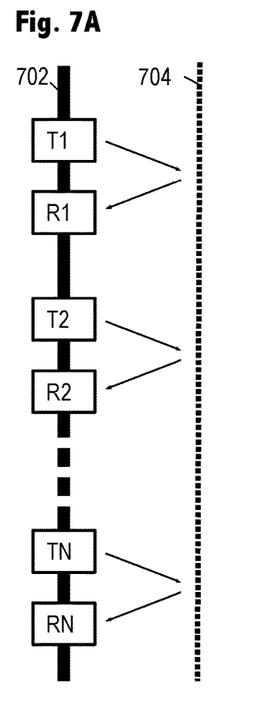
FIGS. 7A-7C show illustrative transducer array configurations.
Figure 7B:
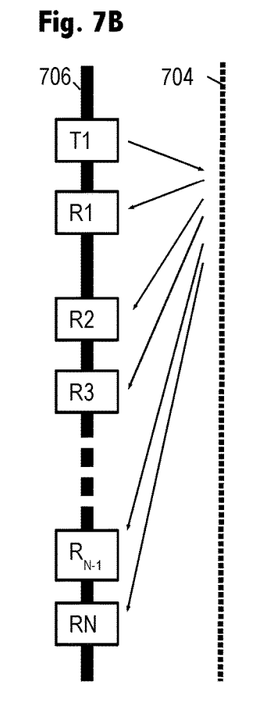
Figure 7C:
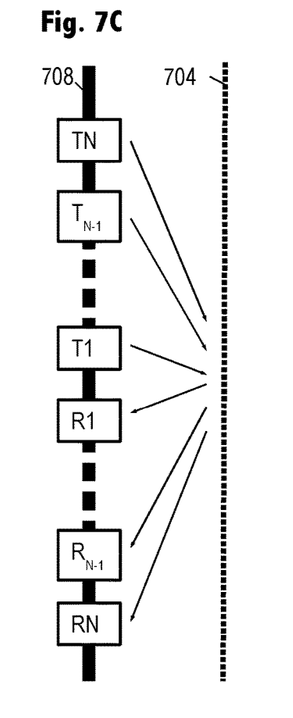

FIGS. 7A-7C show a casing 702 with various illustrative array configuration modes for tracking an approaching fluid front 704. FIG. 7A shows a "common-offset" configuration mode having multiple sets of equally-spaced transmit and receive antennas. (If collocated transmitters and receivers are employed, the common offset would be zero.) FIG. 7B shows a "common-source" configuration mode having multiple receiver antennas responding to a single transmit antenna. FIG. 7C shows a "common-midpoint" configuration mode having multiple sets of transmit-receive antennas with a shared midpoint. Common-source and common-midpoint modes can be categorized as multi-offset modes. In general, multi-offset modes offer imaging advantages over common-offset mode, including improved signal to noise ratio, increased depth penetration, enhanced reflector continuity and lateral imaging. In practice, the chosen array configuration is not likely to be restricted to single-purpose transducers (i.e., transmit or receive) operating in a single mode, but rather is likely to employ transceivers and be usable in multiple such modes or a mode that shares features of common offset, common source, and common midpoint modes.

Figure 8:
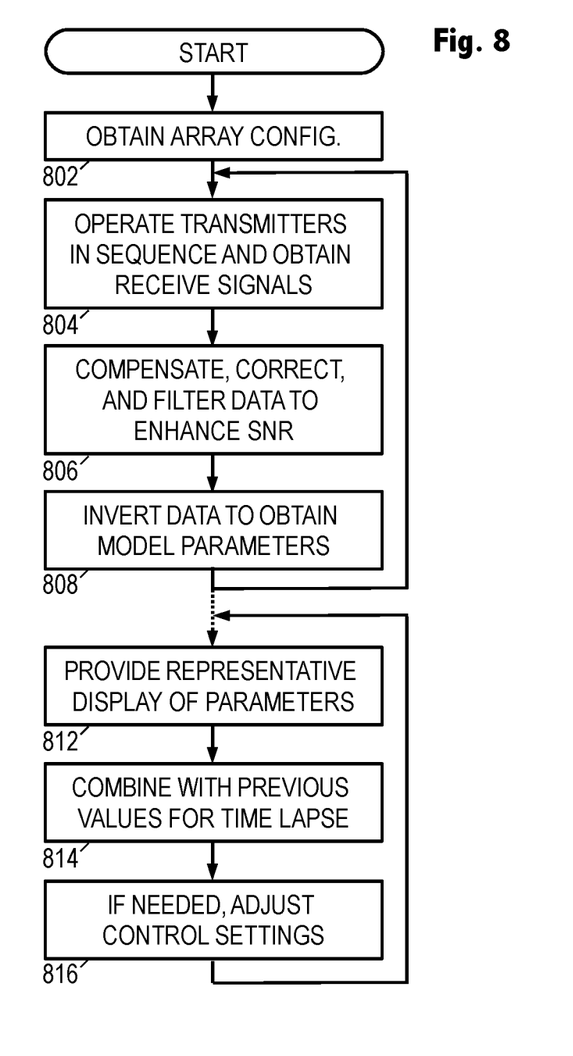
FIG. 8 is a flow diagram of an illustrative fluid front monitoring method.

FIG. 8 is a flow diagram of an illustrative fluid front monitoring method that may be carried out by processor unit in communication with one or more well interfaces. In block 802, the processor unit obtains the array configuration information including relative positions of the well casings, the positions of the various electromagnetic transducers, and the orientations of the transmit and receive antennas and any other sensors. The configuration information may further include the transmit signal frequencies and/or pulse shapes. Some embodiments may employ transient or ultra-wideband signals. In block 804, the processor unit optionally triggers the transmitters, but in any event obtains responsive measurements from the receivers. In addition to some identification of the measurement time and the associated transmit and receive antennas, the signal measurements may include signal strength (e.g., voltage), attenuation, phase, travel time, and/or receive signal waveform. In block 806, the processor unit performs initial processing to improve the signal-to-noise ratio of the measurements, e.g., by dropping noisy or obviously erroneous measurements, combining measurements to compensate for calibration errors, demodulating or otherwise filtering signal waveforms to screen out-of-band noise, and/or averaging together multiple measurements.

In addition, the processor may apply a calibration operation to the measurements. One particular example of a calibration operation determines the ratio of complex voltage or current signals obtained at two different receivers, or equivalently, determines the signal phase differences or amplitude ratios. Another illustrative calibration operation subtracts out the inhomogeneous static formation effect by first making an initial measurement with fluid front far away, and then subtracting this background measurement from the subsequent measurements.

In block 808, the processor unit performs an inversion to match the measurements with a synthetic measurements from a parameterized model. The model parameters may include formation resistivity R (on both sides of the front), distance (d) from the receiver to the front, dip angle ($\theta$) between the casing axis and the normal to the front, and azimuth ($\Phi$) of the normal relative to a pre-defined X-axis for the receiver. Where an insufficient number of independent measurements exist, some of these parameters (e.g., formation resistivities) may be assumed. Where additional independent measurements are available (e.g. measurements at additional receivers, frequencies, and/or from different wells), the number of model parameters may be increased to include, e.g., relative positions and orientations of different wells, distances and orientations of different points on the fluid front, and the shape of the fluid front. The fluid front shape may be parameterized in different ways. Illustrative parameterized shapes are an oval with minor and major axes, or an ellipsoid with three axial diameters.

Blocks 804-808 are repeated, with the derived parameter values from each step being delivered to an interactive visualization process represented by blocks 812-816. In block 812, the processor unit provides to a user a display having a representation of the derived parameter values. The display may include a graphical representation of the fluid front's position relative to one or more producing wells. Alternative representations include numeric parameter values, a two-dimensional log of each parameter value as a function of time, or simplified representations of a comparison between actual position and actual position. One example of this last representation is a green light when the measured parameter values have a good match to the desired parameter values and a red light when they do not.

In block 814, the processor unit combines the current parameter values with past parameter values to derive a fluid front velocity and a time-lapse representation of the fluid front position. These parameter values may be similarly displayed to the user.

In block 816, the processor unit may automatically adjust a control signal or, in an alternative embodiment, display a control setting recommendation to a user. For example, if the front velocity is undesirably high, or if the front has approached closer than desired to the producing well, the processor unit may perform or recommend a reduction in the production rate and/or a reduction in the injection rate. Where multiple injection or production zones are available, the system may redistribute the available production and injection capacity with appropriate valve adjustments to keep the front's approach as uniform as possible. Blocks 812-816 are repeated as new measurements become available to monitor the fluid front's position.

In some contemplated system and method embodiments, at least some of the transmit and/or receive antennas are tilted in different azimuths to enable azimuthal measurements such as those obtained with a rotating tool as disclosed in U.S. Pat. No. 7,659,722 "Method for azimuthal resistivity measurement and bed boundary detection" to Michael Bittar. To obtain such measurements from a stationary antenna arrangement, a virtual steering technique can be employed such as that disclosed in U.S. Pat. No. 6,181,138 "Directional Resistivity Measurements for Azimuthal Proximity Detection of Bed Boundaries" to T. Hagiwara and H. Song.

Numerous variations and modifications will become apparent to those skilled in the art once the above disclosure is fully appreciated. For example, the foregoing disclosure focuses on the use of tilted and untilted magnetic dipole antennas, but the disclosed principles are applicable to other transducer types including multicomponent electric dipoles and further including various magnetic field sensors such as fiberoptic sensors, MEMS sensors, and atomic magnetometers. As another example, the casing string need not be straight and the array of transducers need not be linear. Rather, the transducers can be deployed along a curve without impairing the operability of the system. It is intended that, where applicable, the claims be interpreted to embrace all such variations and modifications.

What is claimed:

1. A monitoring method that comprises:
   transmitting a transmit signal with a transmit antenna that encircles an outer casing string cemented into a borehole;
   receiving a first set of one or more responsive receive signals with respective receive antennas that each encircle the outer casing string, wherein at least one of said receive antennas is not parallel to the transmit antenna;
   performing a first measurement to set a background measurement, wherein the background measurement is an estimated distance to a fluid front, a fluid front velocity, and a time-lapse representation of a fluid front position based at least in part on said first set of receive signals;
   performing a second measurement to record a second set of one or more response receive signals;
   filtering out noise to enhance a signal to noise ratio;
   combining the second set of one or more responsive receive signals to probe a formation at multiple depths of investigation;
   performing an inversion on the second set of one or more responsive receive signals;
   matching the second set of one or more responsive receive signals with synthetic measurements from a parameterized model;
   deriving second estimated distance to the fluid front, the fluid front velocity, and the time-lapse representation of the fluid front position based at least in part on said second set of receive signals, wherein the deriving is based at least in part on a cross-component signal strength; and
   subtracting the background measurement from the second set of receive signals to determine a signal contribution from the front.

2. The method of claim 1, wherein the fluid front is an interface between a formation fluid and an injected fluid.

3. The method of claim 2, wherein the formation fluid comprises a hydrocarbon and the injected fluid comprises water or steam.

4. The method of claim 2, further comprising adjusting an injection or production control setting based at least in part on the estimated distance.

5. The method of claim 1, wherein said deriving is performed without dependence on a diagonal-component signal strength.

6. The method of claim 1, wherein said deriving is performed based on multiple orthogonal receive signal components.

7. The method of claim 6, further comprising determining an estimated azimuthal direction to the fluid front based at least in part on said multiple orthogonal receive signal components.

8. The method of claim 1, further comprising:
   performing said transmitting and receiving operations in a second borehole having a second casing string encircled by a second set of one or more transmit antennas and one or more receive antennas yielding a third set of receive signals; and
   deriving a third estimated distance to the fluid front based at least in part on said third set of receive signals.

9. The method of claim 8, further comprising estimating a position and shape of the fluid front based at least in part on the estimated distances.

10. The method of claim 1, wherein the transmit signal is a transient pulse or an ultra wideband signal.

11. The method of claim 1, wherein the transmit signal comprises multiple carrier frequencies.

12. The method of claim 1, further comprising repeating said transmitting, receiving, and deriving to track the estimated distance as a function of time.

13. The method of claim 1, further comprising injecting via said outer casing string a flood fluid into a formation penetrated by said borehole.

14. The method of claim 1, further comprising producing via said outer casing string a formation fluid from a formation penetrated by said borehole.

15. A monitoring system that comprises:
   a borehole that penetrates a subsurface formation;
   a casing string cemented in place within the borehole;
   at least one transmit antenna that encircles an outer casing string, said transmit antenna transmitting a transmit signal into the subsurface formation;
   one or more receive antennas that each encircle the outer casing string, said one or more receive antennas receiving respective receive signals in response to said transmitting of the transmit signal, wherein at least one of said one or more receive antennas is not parallel to said transmit antenna; and
   a processing unit that is programmed to:
      filter out noise;
      combine one or more responsive receive signals to probe a formation at multiple depths of investigation;
      perform an inversion on the receive signals;
      match the receive signals with synthetic measurements from a parameterized model;
      derive, based at least in part on said receive signals, an estimated distance to a fluid front, a fluid front velocity, and a time-lapse representation of a fluid front position, wherein the processing unit takes into account a cross-component signal strength; and
      apply a calibration operation to the receive signals to remove a background contribution.

16. The system of claim 15, wherein the fluid front is an interface between a formation fluid and an injected fluid, and wherein the formation fluid comprises a hydrocarbon and the injected fluid comprises water or steam.

17. The system of claim 15, wherein the system comprises multiple non-parallel transmit antennas or multiple non-parallel receive antennas, and wherein the processing unit derives the estimated distance from signal strengths of multiple orthogonal receive signal components.

18. The system of claim 17, wherein the processing unit further derives an estimated azimuthal direction to the fluid front based at least in part on said multiple orthogonal receive signal components.

19. The system of claim 15, wherein said one or more receive antennas comprise an axially-spaced array of receive antenna assemblies.

20. The system of claim 19, wherein each assembly comprises receive antennas for multicomponent signal detection.

21. The system of claim 15, further comprising a second borehole having a second casing string encircled by a second set of one or more transmit antennas and one or more receive antennas yielding a second set of receive signals, wherein said processing unit derives a second estimated distance to the fluid front based at least in part on said second set of receive signals.

22. The system of claim 21, wherein the processing unit estimates a position and shape of the fluid front based at least in part on the estimated distances.

* * * * *